H. L. DOHERTY.
GAS PRODUCING AND CONSUMING APPARATUS.
APPLICATION FILED MAR. 16, 1908.
993,322.
Patented May 23, 1911.
3 SHEETS—SHEET 2.
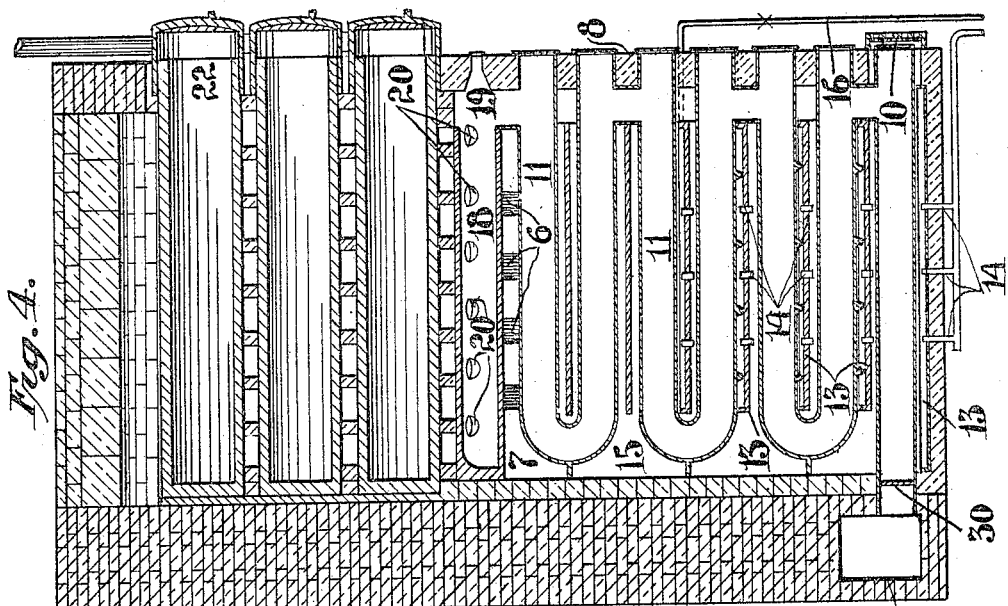
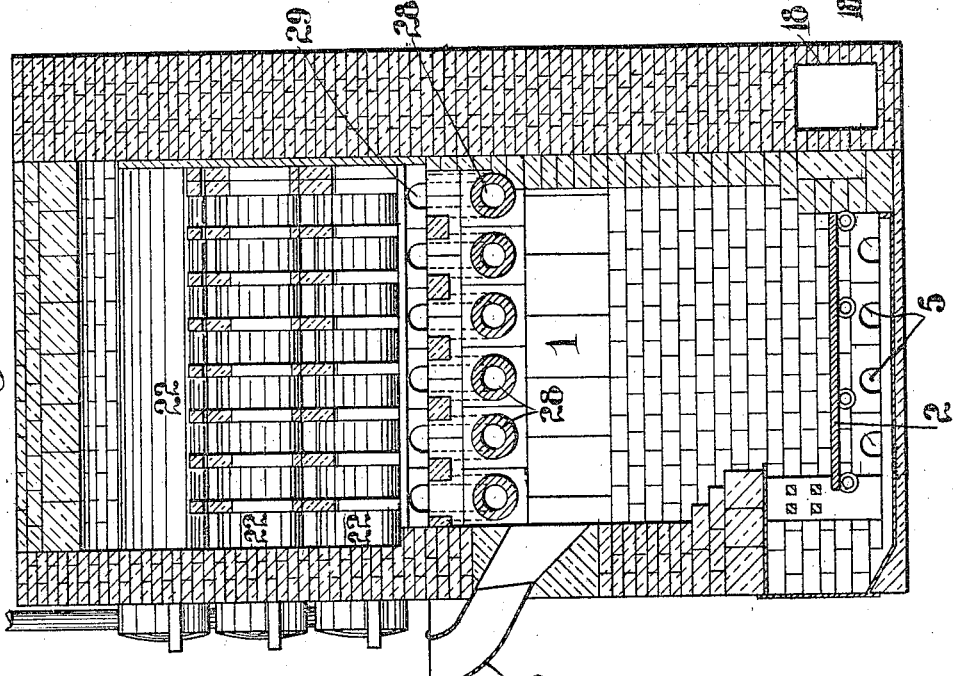

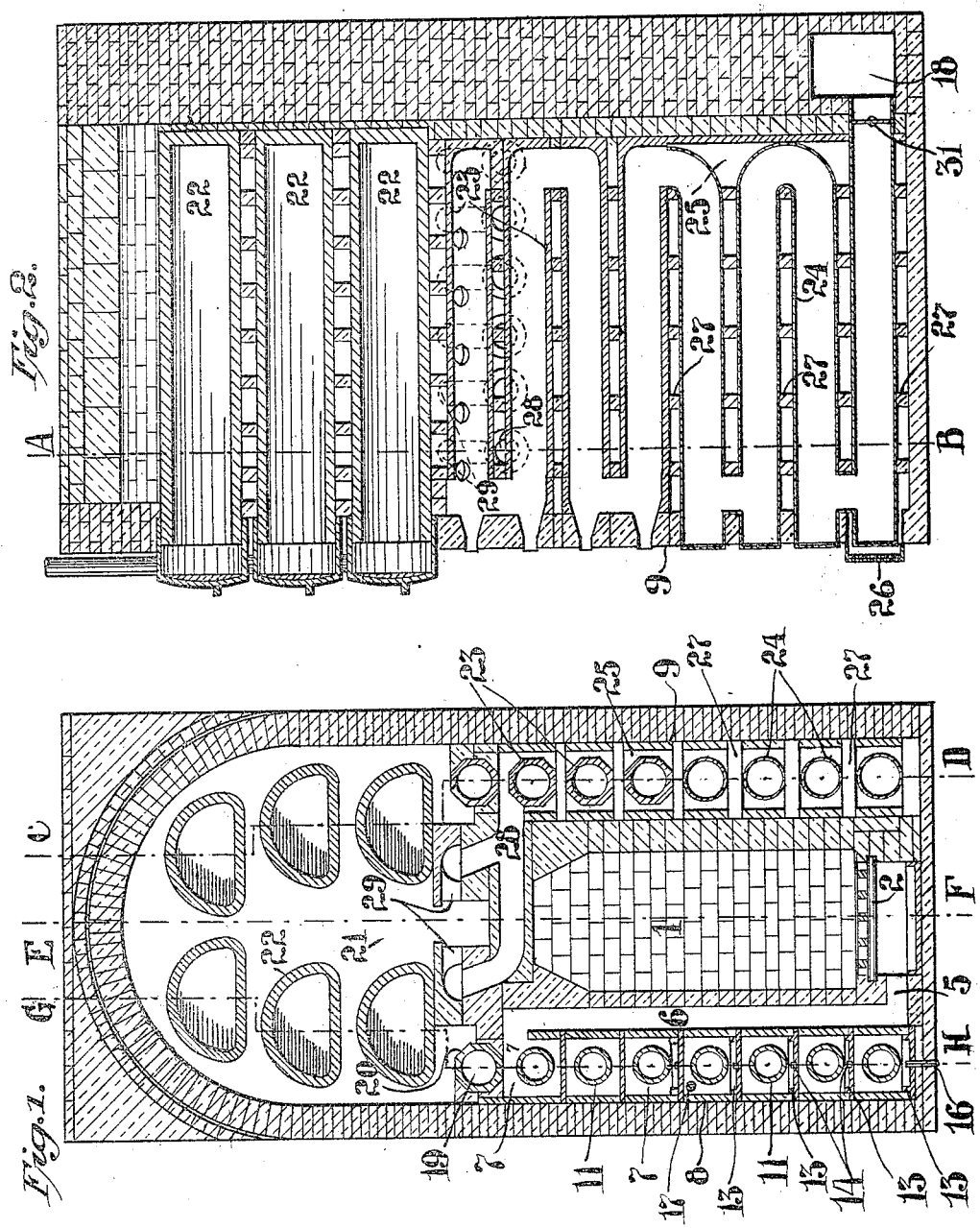

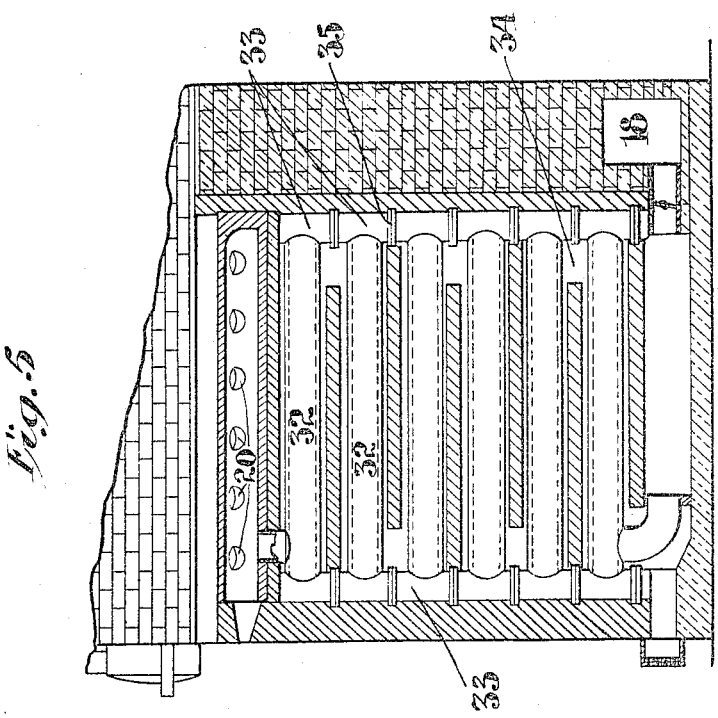

UNITED STATES PATENT OFFICE.

HENRY L. DOHERTY, OF NEW YORK, N. Y.

GAS PRODUCING AND CONSUMING APPARATUS.

993,322.   Specification of Letters Patent.   Patented May 23, 1911.

Application filed March 16, 1908. Serial No. 421,503.

*To all whom it may concern:*

Be it known that I, HENRY L. DOHERTY, a citizen of the United States, residing at New York, in the county of New York and State of New York, have invented a certain new and useful Gas Producing and Consuming Apparatus; and I do hereby declare the following to be a full, clear, and exact description of the same, such as will enable others skilled in the art to which it pertains to make and use the same.

My invention relates to gas producing and consuming apparatus, and particularly to apparatus comprising in combination a gas producer or furnace in which coal or other fuel is burned incompletely with resulting production of a combustible gas consisting largely of carbon monoxid, and air heating recuperators wherein air for the draft current of the producer, and air for the combustion of the gas issuing from the producer, are heated initially by what is otherwise waste heat.

In another application, filed March 16, 1908, Sr. No. 421,502, I have claimed certain features of construction and arrangement of producer and recuperators embodied in the apparatus of my present invention also, and therefore such features are not claimed herein.

My present invention relates to apparatus of the class referred to wherein water vapor is mingled with the air supplied to the producer, such water vapor reacting endothermically with the carbon of the fuel, its hydrogen mingling with the carbon monoxid produced by the incomplete combustion of the carbon, and forming another combustible constituent of the gas produced.

My invention consists in improved means for utilizing waste heat in the heating of the air supplied to the apparatus, in improved means for evaporating water and mingling the same with the draft current of the producer and superheating such water vapor, and in other features hereinafter set forth and particularly pointed out in the appended claims.

The objects of my invention are to conserve as large a proportion as possible of the waste heat of the apparatus, to avoid the use of a separate steam generator, to mingle the water vapor and draft air thoroughly before the mixture reaches the producer, to utilize waste heat efficiently in the evaporation of the water, to superheat the water vapor to a high degree, to raise the temperature of the draft air, or "primary air," to a high degree, to regulate efficiently the temperature in the producer, to insure a practically constant proportion of air and water vapor in the draft current, and to make the apparatus simple, compact, efficient, and readily adaptable to existing apparatus of similar nature.

My invention is susceptible of application to any producer or furnace where large quantities of high-temperature waste gases are available and where preheating of the air supply is desirable, but is particularly adaptable to combinations of a gas producer and gas-consuming furnace in which the two are functionally connected so that the gas from the producer is burned directly in the furnace as it is formed, and in which the products of combustion can be introduced at substantially the temperature at which they leave the furnace, into recuperators for preheating the air required for the producer and for the combustion of the gas, and for the vaporization of the water used in the producer.

As a particular application of my invention I have selected for illustration a furnace for heating retorts for the making of illuminating gas—such furnaces being commonly known as gas-benches. I have selected this application of my invention for the reason that it furnishes ideal conditions for the operation of the invention; but there are a great many other well known types of furnaces in connection with which my invention can be used with great advantage. For instance, it can be applied to gas producers used in connection with zinc furnaces, reheating furnaces, etc.

As set forth in my Patent No. 829,105, dated August 21, 1906, in the operation of a gas producer it is necessary to provide some means for keeping down the temperature of the fuel bed in the producer. The reaction on which the formation of producer gas principally depends is that occurring when carbon is burned with a supply of air insufficient for complete combustion, namely, $C_2 + O_2 = 2CO$. This is a highly exothermic reaction, 4450 B. T. U. being liberated for every pound of carbon burned. According to the process of my said prior patent, this excess of heat is absorbed by the endothermic reaction involved in the reduction of carbon dioxid to carbon monoxid and the combination of the liberated atom of oxygen with carbon ($CO_2 + C = 2CO$). Prior to such patented process, however, it was the custom to absorb the excess heat by the vaporization of water and the dissociation of the elements of water; and in some cases the use of water as described to keep down the producer temperature is still preferred. As water has commonly been used for such purpose heretofore, its use has been attended with great waste of heat, due largely to the fact that the vaporization of the water has been done either in a separate boiler (requiring the combustion of fuel for the special purpose of vaporizing such water), or by heat taken from the producer itself; as for example, by passing the entering draft current of air over a body of water heated by the fuel bed in the producer, or by introducing air and water into the ash-pit of the producer, the water being converted into steam by absorption of latent heat taken from the fuel in the producer itself. There is broadly speaking, no loss of heat in the system due to dissociation of steam into its elements, the heat absorbed in dissociation being returned to the cycle in the subsequent recombination of the elements in the furnace. So far as the producer is concerned, therefore, there is no loss of heat due to the introduction of steam into the producer save that required to heat the steam from the temperature at which it is introduced to that at which the waste gases leave the furnace; and this loss is only serious when the water vapor or steam is supplied in such quantity and the temperature of the producer is so low that a large proportion of it goes through the producer undecomposed. But if the water must be vaporized into steam by heat taken directly from the fuel in a boiler, or in any other way than by the utilization of otherwise wasted heat, a considerable loss, which may be avoided by the means herein described, necessarily results.

Ordinarily, in producers operating with a draft current of air and water vapor or steam, the air has been supplied to the producer with little or no previous heating. It is clear that the heat absorbed in heating this air up to the temperature at which the waste gases are discharged, is so much heat abstracted from that which the producer is capable of converting into useful potential heat in the producer gas. In the great majority of cases where producer gas is applied to the heating of furnaces, etc., the products of combustion leave the apparatus at a temperature above 1000° F. Even where recuperators are employed to conserve part of this heat carried out of the furnace the temperature of the waste gases is seldom reduced below 800° F. If the air enters the producer at 60° F. this means, even when the waste gases are reduced to 800° F., a loss of over 25000 B. T. U. more or less per pound of carbon gasified in the producer. Assuming that the waste or flue gases leave the furnace at a temperature of 1000° (which is a much lower temperature than is generally obtained even when regenerators are used) there is a loss of sensible heat in the gases of 3135 B. T. U. more or less. By the method and means herein described and illustrated, I utilize a large part of this heat of the waste gases to raise the temperature of the secondary air and also to raise the temperature of the primary air and to vaporize water, the resulting steam being mixed with such primary air; and I am thus enabled to return to the producer the greater part of the waste heat in the products of combustion and thereby I greatly increase the economy of operation and the efficiency of the apparatus. The vaporization of the water and heating up of incoming draft currents being no longer required to be done to any considerable degree by heat derived from the producer itself, a greater proportion of steam may be dissociated in the producer and therefore a greater proportion of the heat generated in the producer is returned to the cycle by the subsequent recombination of hydrogen and oxygen in the furnace; also the calorific value of gas issuing from the producer into the furnace is higher.

It is important to superheat the water vapor to a high degree, to facilitate its decomposition in the producer; and also to mingle the water vapor thoroughly with the air; and furthermore it is particularly desirable to conduct the evaporation of the water in connection with the heating of the air and during the earlier stages of such heating, for during such evaporation the consequent absorption of latent heat keeps down the temperature to a relatively low point, so that there is a relatively great temperature-difference between the air and waste gases, the latter already cooled considerably during their passage through the upper sections of the recuperator, so that a relatively larger proportion of contained heat is abstracted from the waste gases than would be the case if the evaporation were done after the air had already been heated to a high degree. In other words, by doing the evaporation of the water by waste gases which have already parted with a large proportion of their heat in superheating the water vapor to a high degree and in heating the air to a high degree, heat is utilized efficiently which would otherwise be relatively unavailable, owing to the relatively low temperature of the waste gases.

It is obvious that there cannot be an efficient interchange of heat between relatively cool waste gases and a body of water when the latter is separated from the waste gases by thick metal walls, such as are necessary when the water is evaporated in a boiler set into the recuperator. This difficulty I avoid, according to my invention, by providing the air passages of the recuperator with water-supply means, so that the air in passing through these passages itself evaporates the water, taking up the water vapor as fast as formed and so greatly facilitating the liberation of more vapor, and also keeping the air relatively cool and relatively moist in the early stages and so in a relatively good condition to take up heat from the already partly-cooled waste gases. The absorption of the water vapor as fast as formed by the air results in a particularly thorough admixture of the air and water vapor, which is particularly favorable to efficient action of both in the fuel-bed of the producer.

In the accompanying drawings, showing one form of gas bench embodying my invention, Figure 1 represents a vertical transverse section, looking from the front, on the line A B of Fig. 2. Fig. 2 represents a longitudinal section on the irregular section line C D of Fig. 1, the section being taken through one row of retorts and through the recuperator for the secondary air. Fig. 3 shows a central vertical section through the producer and furnace on the line E F of Fig. 1; and Fig. 4 shows a vertical longitudinal section on the irregular section line G H of Fig 1, the section being taken through the primary recuperator and vaporizer. Fig. 5 is a vertical section of an alternative form of secondary recuperator.

The drawings represent simply a single retort furnace or bench with its gas producer. In practice the benches are always built together in groups or batteries, two benches being placed back to back forming a twin furnace or bench setting. Any number of these twin benches may be built together side by side. For the purpose of illustrating my invention, however, it is sufficient to represent simply a single individual bench.

In the drawings 1 designates the gas producer having a grate 2 and charging chute 3. This chute leads upward to the retort charging floor, which is indicated at 4. The fuel, which may either be coal, or coke remaining from the distillation of the coal used in the retorts, is charged into the gas producer through 3 and is supported therein on the grate 2. In practice, a bed of ashes is allowed to accumulate on the grate to a considerable depth, a bed of ignited fuel being built up on this. As is usual in producer practice, the depth of fuel bed is, generally, considerable, since by using a considerable depth of fuel a gas of much better and more uniform quality is secured.

The air for the partial combustion which takes place in the producer is admitted through the ports 5 under the grate 2, which ports communicate by passages or flues 6 with the upper longitudinal flue 7 of the primary recuperator 8. This primary recuperator comprises a series of flues 7 within which are other flues (usually metal pipes) 11 through which a portion of the products of combustion from the furnace pass in escaping to the stack. The air to be heated enters the lowermost of the flues 7 through a suitable damper or register 10 (Fig. 4), and thence passes upward through the various flues 7 and around the heating flues 11, each flue 7 except the last being connected to the flue 7 next above it, the connections being alternately in front and in rear, so that the flues 7 in principle form a return-bend passage for the air. The various heating pipes 11 are likewise connected in series so as to form in principle a return-bend heating coil. The uppermost of the flues 7 is connected to the passages 6. In several of the lower flues 7 are water pans 13 provided with overflow connections 14, whereby when the water level in any pan rises above the level of such overflow connections the surplus passes through such overflow connections, over the heating pipe 11 below to the pan beneath and so on until the lowest pan is reached. The overflow connections of this lowest pan connect with a wastepipe 16. These pipes over which the water drips, may be provided on their under sides with transvers ribs to prevent the water from traveling endwise on them and so dropping mainly from one end or the other of the pipes. It is of course desirable that the fall of the water from the pipes shall be fairly uniform. In case there is reason to believe that at times moisture communicated to the air during its passage through the flues 7 by the evaporation of the water in said pans, may not be sufficient for the purpose desired, an auxiliary steam supply may be provided, for example, a steam pipe 17 opening into one of the flues 7. The lowermost of the pipes 11 communicates with an offtake flue 18 (Fig. 4). The uppermost of the pipes 11 connects with a flue 19, preferably of refractory material, having ports 20 leading into the furnace or main combustion chamber 21 within which are the various retorts 22. The hot combustion gases from this furnace 21 enter the flue 19 at or about 2000° F., usually, and during their passage downward through the recuperator 8 they give up a large part of their sensible heat to the entering air current surrounding them and flowing upward in a direction the reverse of the downward flow of these products of combustion. Such entering air current is therefore highly heated and returns to the producer a large part of sensible heat of the products of combustion which would otherwise be lost. A further portion of the heat of these products of combustion is utilized in the evaporation of water in the pans 13 and of moisture picked up by the air current; all the water carried by the air current being therefore converted into steam highly superheated by the time the air has passed through outlet 5 into the ash-pit. By these two methods of absorbing and utilizing the waste heat of the portion of the products of combustion passing through recuperator 8, a very large portion of available heat of such waste gases is utilized. It will be apparent that not only will the water vapor be mixed most thoroughly with the primary air, but that the proportion of water vapor to air will be practically constant so long as the feed of water or steam to the compartments of the primary recuperator is constant; also, that the proportion of water vapor to the air may be varied within wide limits; by supplying water to more or less of the pans 13. In this way the proportion of water to air, may be varied so that the steam is highly superheated after leaving the recuperator, or that the air is merely saturated, or that it carries a large excess of water. Thereby the temperature in the producer may be regulated as desired.

The secondary recuperator 9, upon the opposite side of the furnace, comprises, in its upper part, flues 23 preferably of refractory material and, in its lower part, pipes 24, preferably of metal, these flues and pipes connected in series so as to constitute in principle a return-bend coil, as clearly shown in Fig. 2. These flues 23 and 24 are located in a vertical flue 25 to the lower portion of which air is admitted through a perforated grate or damper 26 as indicated in Fig. 2, the various flues 23 and 24 being supported one above the other upon cross pieces 27 so that the air so entering and passing upward through the flue 9 passes over and around the flues 23 and 24 in a direction which is in general the reverse of the direction of flow of the products of combustion through the recuperator, and thence passes through flues 28 and nostrils 29 into the combustible gas rising from producer 1, causing the combustion of such gas within chamber 21 and around the retorts 22, one part of the resulting products of combustion passing out through recuperator 8 and the other part outward through recuperator 9, as previously described.

The connection of two recuperators in "parallel" (to borrow an electrical term) instead of in series (i. e., the primary recuperator taking the products of combustion after they have passed through the secondary recuperator) has the important advantage that, since the products of combustion enter the primary recuperator at practically the temperature of the furnace, they are hot enough to heat the primary air to an effective degree as well as to evaporate a large amount of moisture; whereas the products of combustion after leaving the secondary recuperator have been lowered in temperature so much (and would be lowered in temperature so much even if all the products of combustion were passed through the secondary recuperator) that they are too cold to heat the primary air effectively and to vaporize the desired amount of moisture.

The lower sections of the secondary recuperator are of metal in order to permit as efficient transfer of heat through their walls as possible; the upper sections of this recuperator being shown as made of refractory material, this being practically necessary owing to the high temperature in this portion of the recuperator. The temperature in the primary recuperator being more moderate owing to the presence of water vapor, all or most of the sections of this recuperator may be made of metal except the uppermost section—the section above where the heated draft current is led off to the ash-pit. I provide dampers 30 (Fig. 4) and 31 (Fig. 2), between the primary and secondary recuperators respectively, and the offtake flue 18, to provide for regulable distribution of the relative amounts of products of combustion passing through the two recuperators.

In Fig. 5 I illustrate a secondary recuperator alternative to that shown in Fig. 2 and in which both the air and the products of combustion pass in zig zag course through the recuperator as in Fig. 2, the products of combustion pass through return flues 32 connected at the end by tees 33, and the air passes upward through zig zag flues 34 within which the flues 32 are located. In the construction shown plates 35 (usually of iron) are interposed in alternate joints between tees 33, to force the products of combustion to pass in tortuous course to the offtake 18.

Most gas benches in use at the present day either have only secondary recuperators or, if provided with both primary and secondary recuperators, the primary recuperators are below the secondary recuperators and receive the waste gases only after the latter have passed through the secondary recuperators. In which case the waste gases are too cold, when they reach the primary recuperator, to evaporate water and superheat water vapor and heat air efficiently. It is substantially impracticable to reconstruct such existing gas benches to provide both primary and secondary recuperators on each side of the producer and both taking waste gases direct from the retort oven. But it is relatively easy to reconstruct such existing gas benches by providing a primary recuperator on one side of the producer and a secondary recuperator on the other side of the producer, as herein illustrated and described, and in such case the waste gases are received in the primary recuperator at substantially the temperature at which they leave the retort oven and hence at a temperature such that they can evaporate moisture and superheat water vapor and heat the primary air efficiently.

It has been proposed heretofore to pass the primary air and the secondary air through separate recuperators, heated by separate currents of waste gases, and then to pass the heated primary air over water contained in the ashpit beneath the producer, in order that such air may take up water vapor to give the required endothermic action in the producer. It is obvious, however, that the economy of such an apparatus cannot be as great as that of an apparatus of equally good design in which the water is brought into contact with the primary air in the first or lower-temperature passages of the primary recuperator, because in the prior proposed apparatus referred to, owing to the low specific heat of dry air and to there being no absorption of heat by evaporation of water, the temperature of the primary air rises much more rapidly in the first portion of the primary recuperator than when water is being evaporated in that portion of the recuperator, and so the exchange of heat between the waste gases and the primary air is less efficient, and the primary air issuing from the primary recuperator carries with it a lower proportion of heat units. Furthermore, in the prior proposed apparatus referred to, the heated primary air entering the ash pit will necessarily be greatly lowered in temperature as the result of absorption of latent heat in evaporating the water in the ash pit, so that the draft current of air and water vapor will encounter the fuel in the producer at a lower temperature and with a lower degree of superheat of the water vapor, (or possibly without any superheat of the water vapor,) than when the water vapor is supplied to the primary air in the first portion of the primary recuperator, according to my invention. The relatively low temperature of the primary air, and the relatively low superheat, or even absence of superheat, of the water vapor, are both unfavorable to the production of a high proportion of carbon monoxid, and occasion waste of heat in heating up the air and water vapor to the temperature of the fuel. Furthermore, when there is a pool of water in the ash pit it is inevitable that such water will abstract considerable heat from the fuel bed above—a source of waste which is avoided by introducing the water into the recuperator instead of into the ash pit.

By introducing the water into the early stages of the primary recuperator I am not only able to abstract a greater portion of the heat of the waste gases, and to avoid unnecessary abstraction of heat from the fuel bed by the water, but the water vapor so introduced into the primary draft current is superheated to a high degree before it leaves the primary recuperator, and so both the primary air and the water vapor in the primary air reach the fuel already heated to a temperature approximating that of the fuel—a condition very favorable to the conversion of a relatively large proportion of the fuel into carbon monoxid. Furthermore, the relatively low temperatures in the earlier sections of the primary recuperator permit the walls which separate the primary air from the waste gases to be of metal—a material of high heat conductivity; for which reason the interchange of heat between the outgoing waste gases and the entering primary air is particularly efficient.

In a divisional application, filed April 21, 1911, Sr. No. 622,549, I claim the process carried out by the above-described apparatus.

What I claim is:—

1. A combined gas producer and furnace, comprising a gas producer, a furnace chamber arranged to receive gas therefrom, and primary and secondary recuperators each comprising separate passages for air and for products of combustion, and arranged to receive separate currents of products of combustion from said furnace chamber, said primary recuperator provided with a succession of open water receptacles in its air passage arranged to overflow one into another.

2. The combination of a furnace and a recuperator therefor comprising separate passages for air and waste gases and a succession of open water receptacles in such air passage arranged to overflow one into another.

3. A combined gas producer and furnace, comprising a gas producer, a furnace chamber arranged to receive gas from said producer, and primary and secondary recuperators, both connected to said furnace chamber and arranged each to receive its separate current of products of combustion from such chamber, the primary recuperator comprising separate return-bend passages for the products of combustion and for entering air, arranged one within another and located in the wall of the producer, and comprising also means for supplying moisture to the air passing therethrough, said primary recuperator connected to the lower part of the producer, the secondary recuperator having separate passages for the products of combustion and for the secondary air current, and arranged to deliver the secondary air into the gas issuing from the producer.

4. A combined gas producer and furnace comprising a gas producer, a furnace chamber arranged to receive gas from said producer, and primary and secondary recuperators, both connected to said furnace chamber and arranged each to receive its separate current of products of combustion from such chamber, the primary recuperator comprising separate passages for the products of combustion and for entering air, and comprising also means for supplying moisture to the air passing therethrough, the secondary recuperator comprising two flue-passages, for air and products of combustion respectively, one such passage located within the other and composed of sections, certain of which are composed of material of relatively high heat conductivity and others of which are composed of refractory material.

5. A combined gas producer and furnace comprising a gas producer, a furnace chamber arranged to receive gas from said producer, and primary and secondary recuperators, both connected to said furnace chamber and arranged each to receive its separate current of products of combustion from such chamber, the primary recuperator comprising separate flue-passages for the products of combustion and for entering air respectively, located one within another, the inner flue passage composed of a plurality of return-bend sections, the outer flue passage comprising water receptacles beneath the inner flue passage.

6. A combined gas producer and furnace comprising a gas producer, a furnace chamber arranged to receive gas from said producer, and primary and secondary recuperators, both connected to said furnace chamber and arranged each to receive its separate current of products of combustion from such chamber, the primary recuperator comprising separate flue-passages for the products of combustion and for entering air respectively, located one within another, the inner flue passage composed of a plurality of return-bend sections, the outer flue passage comprising a plurality of water pans arranged one above another and alternated by the sections of the inner flue passage, said pans provided with overflow connections arranged to discharge overflow water upon the sections of the inner flue passage immediately beneath and thence over the surface of such sections to the pans beneath.

In testimony whereof I affix my signature in the presence of two witnesses.

HENRY L. DOHERTY.

Witnesses:
GEO. S. PEARSON,
FRANK W. TRUANOFF.